Jan. 22, 1957 N. MAYHILL ET AL 2,778,510
SWIVEL DISCHARGE STACK FOR AGRICULTURAL HARVESTER
Filed Oct. 14, 1952 4 Sheets-Sheet 3
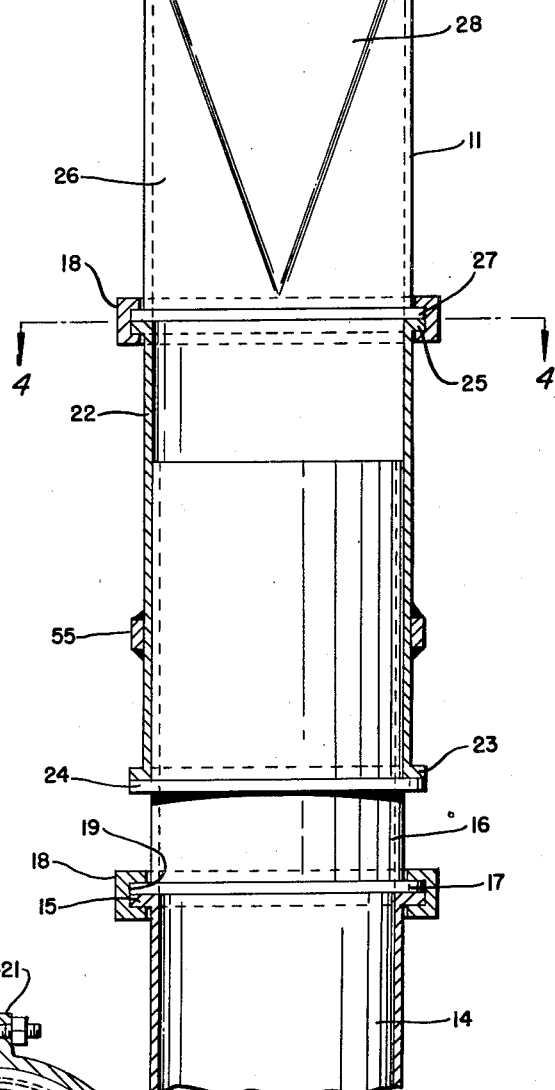
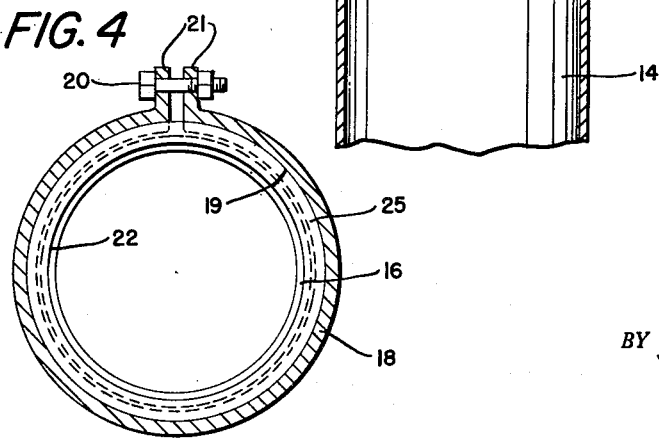
INVENTORS
NOBLE MAYHILL &
CHARLES S. BRANDT
BY
ATTORNEYS

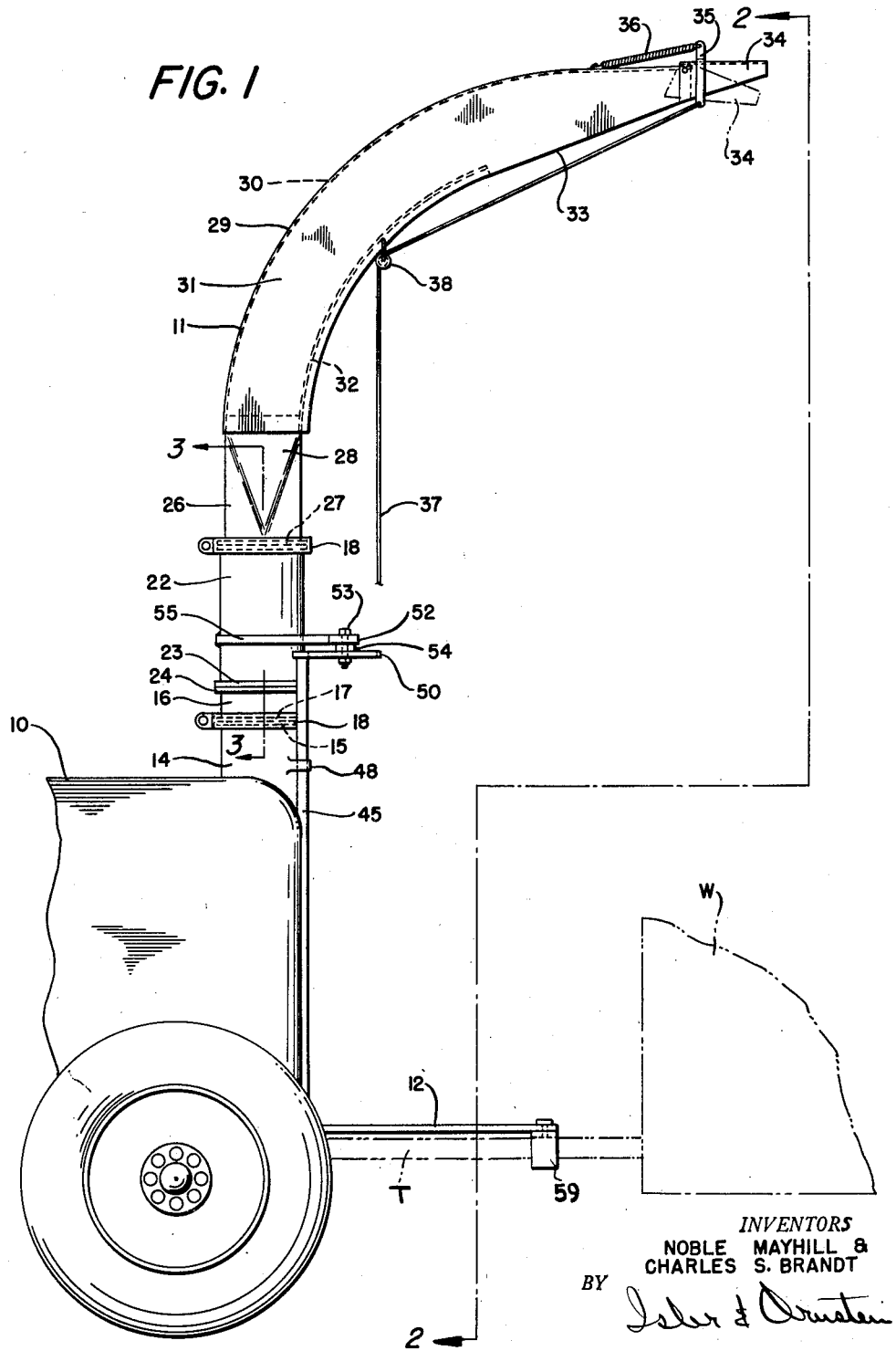

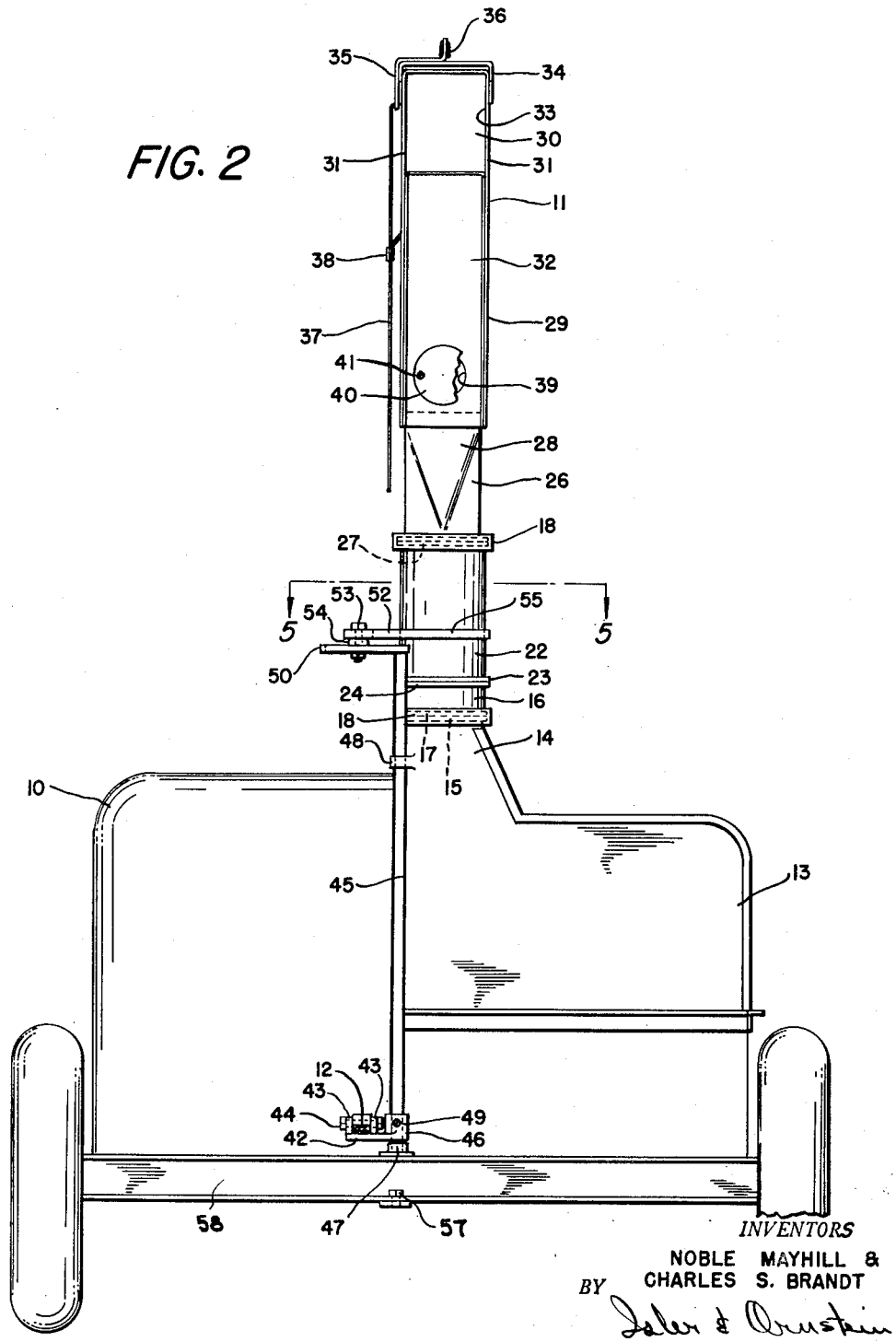

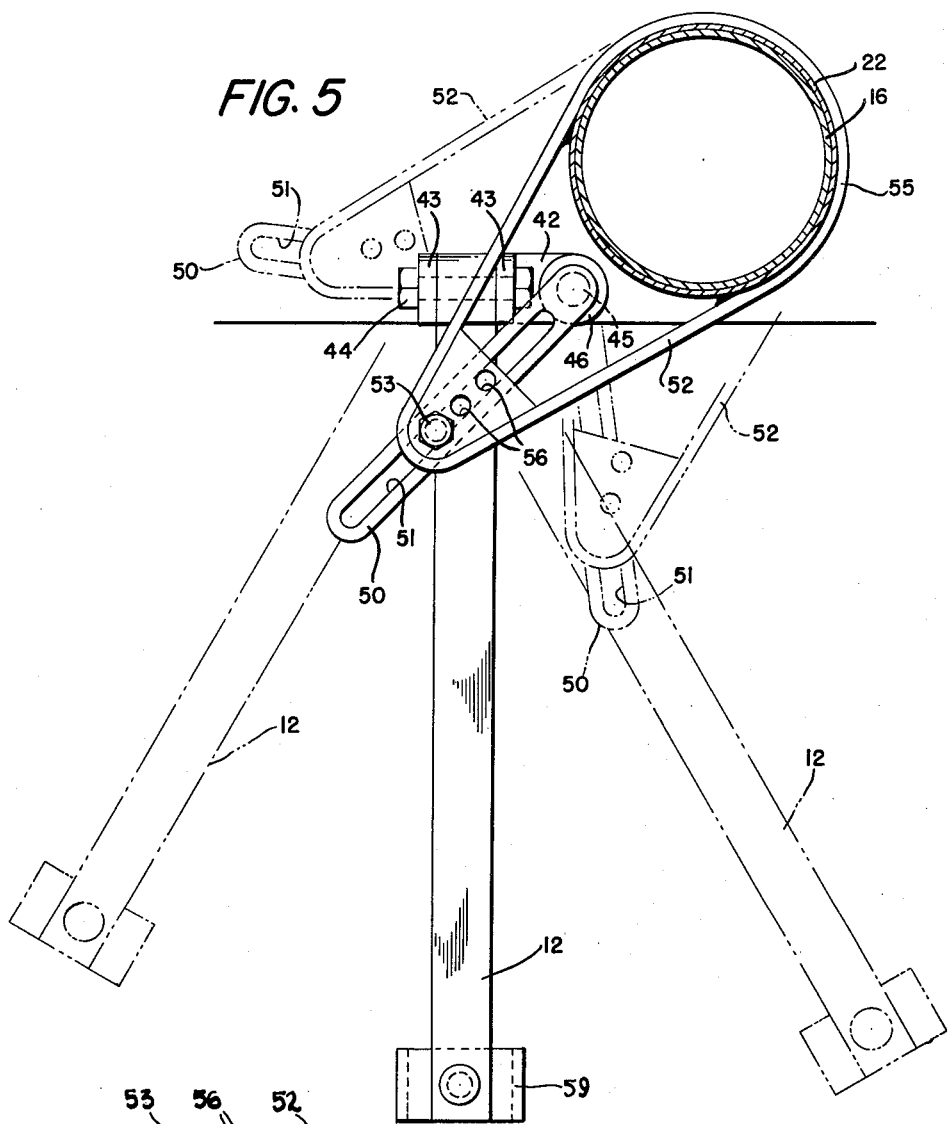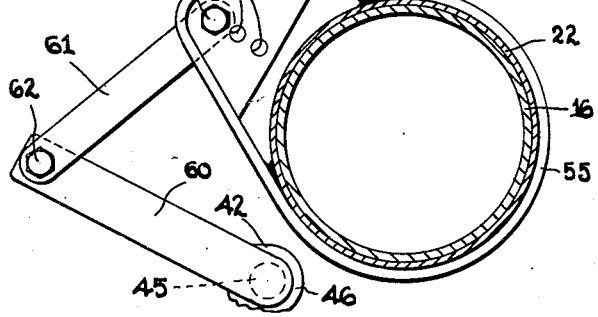

United States Patent Office 2,778,510
Patented Jan. 22, 1957

2,778,510

SWIVEL DISCHARGE STACK FOR AGRICULTURAL HARVESTER

Noble Mayhill, Wichita, Kans., and Charles S. Brandt, Nevada, Ohio, assignors to The Cobey Corporation, Galion, Ohio, a corporation of Ohio Application October 14, 1952, Serial No. 314,616

2 Claims. (Cl. 214—42)

The present invention relates to discharge stacks or spouts for agricultural harvesters or mills, and more particularly to a trailing or swivel stack which will direct ensilage and the like to the interior of a carrier.

It is the primary object of our invention to provide a rotatably mounted stack which will be responsive to directional changes in the movement of a trailing carrier into which harvested or cut material is being discharged.

Other objects and advantages of our invention will be apparent during the course of the following description. In the accompanying drawings forming a part of this specification and in which like numerals are employed to designate like parts throughout the same, Fig. 1 is a side elevation of a discharge stack embodying the features of our invention;

Fig. 2 is a rear elevation of the stack shown in Fig. 1, taken as indicated by line 2—2 of Fig. 1;

Fig. 3 is a fragmentary view partly in section and partly in elevation, taken on line 3—3 of Fig. 1;

Fig. 4 is a cross-sectional view taken on line 4—4 of Fig. 3; and

Fig. 5 is a fragmentary cross-sectional view taken on line 5—5 of Fig. 2 and showing the movement of the stack, and Fig. 6 is a view similar to Fig. 5, but showing a modification.

Referring more particularly to the drawings, the reference character 10 is used to indicate generally a wheeled agricultural implement or machine which is used for harvesting and chopping grain or hay or which may merely be a rotary cutter for ensilage. Devices constructed for this general purpose are well known in the art and need not be described in this specification. It is sufficient to say that such devices generally embody a rotary blower which serves to blow or convey the ensilage through a stack 11 to an elevated level where it is discharged.

The device 10 is generally drawn by a tractor or other prime mover and is trailed by a wheeled carrier W which is generally a wagon which is secured to a hitching bar 12 which extends rearwardly from the device 10.

It will be apparent that the discharge end of the stack 11 will be so positioned, that the ensilage will be discharged into the body of the carrier W. However, when the device 10 is turned by the tractor, the device 10 and the carrier W will no longer be in alignment and, unless the position of the stack is changed, the ensilage will not be discharged into the wagon, but instead will be discharged on the field.

In order to avoid the necessity of manually repositioning the stack whenever the equipment is following an irregular or curved path, we have constructed and mounted the stack 11 in such a manner that it will swivel in response to horizontal pivotal movement of the hitching bar 12, so that the discharge end of the stack will at all times overlie the wagon W.

The harvester 10 includes a blower or cutter housing 13 which terminates in a vertically-extending cylindrical extension 14 having a circumferential collar or flange 15 thereon. Resting on the collar 15 is a tube 16 which is of the same internal diameter as the extension 14 and which also has a circumferential collar 17 at its lower end.

The tube 16 is fixedly secured to the extension 14 by means of a split locking ring 18 which is recessed or channeled as at 19 to receive the flanges 15 and 17 and which is drawn tight by means of a fastener, such as a bolt and nut 20, which extends through ears 21 at the ends of the ring. This method of fastening the tube 16 permits ready disassembly of the tube when the equipment has to be transported.

The tube 16 fits slidably into a swivel tube 22 which has a circumferential flange 23 at its lower end. The flange 23 rests upon a circumferential flange 24 which is welded to the tube 16 intermediate the ends thereof and which serves as a bearing surface for the collar 23. The tube 16 telescopes well into the tube 22 to provide a bearing surface for the wall of the tube 22 during rotation of the stack 11, as well as to strengthen the wall of the stack at this point.

The upper end of tube 22 has welded thereto a circumferential collar or flange 25 on which is seated an adapter tube 26 which is provided with a circumferential flange 27 at its lower end. The tube 22 and the adapter tube 26 are fixedly secured to each other by means of another split locking ring 18.

Although the lower end of the tube 26 is cylindrical and of the same diameter as tube 22, it is formed, as indicated at 28, to provide a square cross-section at its upper end. In addition, the upper end of tube 26 may be slightly tapered. A discharge elbow 29 of square cross-section fits slidably over the upper end of adapter tube 26 and will now be described in detail.

The elbow 29 is a formed piece of sheet metal having a top wall 30 and two side walls 31. A bottom wall 32 is welded into place intermediate the side walls 31, and extends from the lower end of elbow 29 to a point a little better than halfway up the elbow, thus leaving a discharge opening 33 in the upper end of the elbow.

Pivotally secured to the upper end of the elbow 29 is a hood or deflector 34 which has fixedly secured to one side thereof a lever 35. One end of lever 35 is connected to an expansion coil spring 36 which is fastened to the top wall 30 of the elbow. The other end of the lever 35 has a rope 37 secured thereto, which rope is trained over a sheave 38 which is suitably secured to one of the side walls 31 of the elbow. The spring 36 normally maintains the deflector 34 in a substantially horizontal position, which is, in effect, an extension of the top wall 30 of the elbow. However, by pulling the rope 37 the deflector is caused to pivot clockwise (as seen in Fig. 1) thus causing the flow of ensilage to be directed downwardly. The dotted outline of the deflector in Fig. 1 indicates the pivotal movement thereof. Upon release of the rope 37, the spring 36 will return the deflector to its normal position.

In order to permit ready access to the interior of the stack 11, such as might be required if the ensilage jams in the tubes, a hand-sized opening 39 is provided in the bottom wall 32 near the lower end of elbow 29. The opening 39 could be sealed by a removable cover 40 which is secured over the opening by means of screws 41.

Reference is now made to Figs. 2 and 5 of the drawings which clearly disclose the actuating means for swiveling the stack. It will be noted that the hitching bar 12 is secured to a bracket 42 having upstanding horizontally spaced ears 43. A bolt 44 extends through the ears 43 and the end of the hitching bar so as to permit vertical pivotal movement of the bar 12 about the axis of the bolt 44.

Such pivotal movement compensates for inequalities in the terrain which would result in a difference in the levels of the harvester 10 and the trailing wagon W. The bracket 42 is fixedly secured by a bolt 49 to a vertical shaft or rod 45 which extends through a bored portion 46 of the bracket and is journalled in a bearing or socket 47 mounted on the harvester 10. The upper portion of the rod 45 extends through a bearing 48 which is secured to the housing extension 14 so that the rod is rotatable about its own longitudinal axis. It will be apparent that this arrangement of parts permits the hitching bar 12 to have pivotal movement in a horizontal plane about the axis of rod 45, and further, that the rod 45 will rotate in direct response to such horizontal pivotal movement of the hitching bar.

The upper end of rod 45 has fixedly secured thereto a crank arm or lever 50 which is provided with a longitudinally extending slot 51. The swivel tube 22 has rigidly secured thereto a radially extending arm 52 which is slidably and pivotally connected to the crank arm 50 by means of a bolt and nut 53 and a spacer 54. The bolt extends through the slot 51 and has free sliding movement therein. Therefore, as the hitching bar 12 pivots in a horizontal plane, as indicated in broken lines in Fig. 5, the rod 45 and crank arm 50 will cause a proportionate rotation of the swivel tube 22. It is to be noted that the arm 52 is welded to the swivel tube at a point where there is a double wall thickness of tubing due to the telescoping of the tube 16 within tube 22. It will also be noted that the arm 52 has a circular portion 55 which substantially embraces the periphery of the tube 22. Both of these factors insure that no localized or undue strain will be placed on the stack 11 during the swiveling operation.

In connecting the wagon W to the harvester 10, the wagon tongue T may be pivotally secured to the device 10 by means of a pin 57 which extends through a portion of the axle 58 of the harvester. The tongue T will thus underlie the hitching bar or draw-bar 12, as shown in Fig. 1. The bar 12 is provided with a saddle member 59 on the end thereof, which serves to straddle the tongue T and causes the bar 12 to respond pivotally to relative turning movement between the harvester 10 and the wagon W.

In the event that it is desired to adjust the relative angularity of the elbow 29 to the hitching bar 12, the split ring 18 which locks tube sections 22 and 26 together may be loosened and the adapter 26 then rotated to the desired position of angularity.

In the event that it is desired that the swivel actuating means be disconnected temporarily, this can be readily accomplished by loosening the screw 49 which will disconnect the bracket 42 from fixed securement to the rod 45 but will still permit rotation of the bracket about the rod.

Another adjustment which can be made is through utilization of radially spaced apertures 56 in the arm 52, which permit the connecting bolt 53 to be located at selected distances from the center of rod 45 thereby varying the ratio of rotation between rod 45 and stack 11 to accommodate for the distance of the wagon from the harvester.

In Fig. 6 is shown a modified form of stack actuating means which may be utilized to obtain a higher ratio of rotation between the swivel tube 22 and the bar 12, than it is practicable to obtain with the structure shown in Fig. 5.

In this modified form of the invention, a crank arm or lever 60 is fixedly secured to the upper end of rod 45 and is pivotally secured to the arm 52 through the intermediary of a link 61. The link 61 has one end thereof pivotally secured by a suitable connector 62 to the end of lever arm 60, and the other end of link 61 is pivotally secured to the arm 52. The linkage arrangement permits the swivel stack to be rotated through a greater angle than would be feasible withe the arrangement shown in Fig. 5.

From the foregoing description it will be apparent that even though the harvester 10 is required to follow an irregular or serpentine course of travel during its operation, the stack 11 will automatically swivel to follow the movement of the trailing wagon, so that the crop is always discharged into the wagon.

It is to be understood that the form of our invention, herewith shown and described, is to be taken as a preferred example of the same, and that various changes in the shape, size, and arrangement of parts may be resorted to without departing from the spirit of our invention, or the scope of the subjoined claims.

Having thus described our invention, we claim:

1. In combination, a mobile blower unit, a vertically extending discharge stack rotatably secured to the outlet of said blower unit, said stack having a radial extension provided with a discharge opening therein, connecting means mounted on said blower unit for pivotally securing a trailing carrier thereto, and actuating means provided on said blower unit for maintaining said discharge opening in overlying relationship to the trailing carrier, said actuating means comprising an axially rotatable shaft mounted on said blower unit, an actuating member detachably secured to said shaft for pivotal movement relatively to said blower unit and supported on said connecting means for pivotal movement therewith, a lever arm fixedly secured to said stack, a crank arm fixedly secured to said shaft and means for slidably and pivotally securing said lever arm to said crank arm to effect angular rotation of said stack in response to axial rotation of said shaft.

2. A swivel stack adapted to discharge airborne ensilage into a trailing carrier comprising the combination of a frame, a vertically extending discharge duct rotatably mounted on said frame, a lever arm fixedly secured to said discharge duct, a vertically-extending shaft journalled in said frame for axial rotation, a crank arm fixedly secured to said shaft and operatively engaging said lever arm, an actuating bar traversed by said shaft, and a removable fastener extending through said bar into engagement with said shaft to secure said bar to said shaft for pivotal movement in a horizontal plane in response to turning movement of the carrier whereby said discharge duct is correspondingly rotated.

References Cited in the file of this patent

UNITED STATES PATENTS

| | | |
|---|---|---|
| 2,465,156 | Huddle | Mar. 22, 1949 |
| 2,608,310 | Penning | Aug. 26, 1952 |
| 2,634,004 | Turek | Apr. 7, 1953 |
| 2,724,516 | Weishaar | Nov. 22, 1955 |